United States Patent [19]
Lin

[11] Patent Number: 5,690,410
[45] Date of Patent: Nov. 25, 1997

[54] LIGHT DEVICE FOR A BICYCLE

[76] Inventor: Tzu-Lung Lin, P.O. Box 53-8, Taichung, Taiwan

[21] Appl. No.: 553,774

[22] Filed: Oct. 23, 1995

[51] Int. Cl.$^6$ ............................................. F21V 33/00
[52] U.S. Cl. ........................... 362/72; 362/192; 340/432
[58] Field of Search ......................... 362/72, 192, 228; 340/432, 480

[56] References Cited

U.S. PATENT DOCUMENTS

| | | | |
|---|---|---|---|
| 3,894,281 | 7/1975 | Bloomfield | 362/72 |
| 5,335,188 | 8/1994 | Brisson | 340/432 |
| 5,497,143 | 3/1996 | Matsuo et al. | 340/432 |
| 5,511,435 | 4/1996 | Kitamura et al. | 340/432 |

*Primary Examiner*—Ira S. Lazarus
*Assistant Examiner*—Alfred Basichas

[57] ABSTRACT

A light device includes a sensor secured to the fork of a bicycle and an inducing block secured to the wheel for moving pass the sensor so as to actuate the sensor. A housing is securing to the bicycle for receiving a microprocessor which is coupled to the sensor. A displayer is coupled to the microprocessor for displaying a speed of the bicycle. Two light bulbs of different wattages are coupled to the microprocessor so as to be energized when the inducing block moves pass the sensor. A switch is coupled to the microprocessor for controlling the lighting modes.

2 Claims, 4 Drawing Sheets

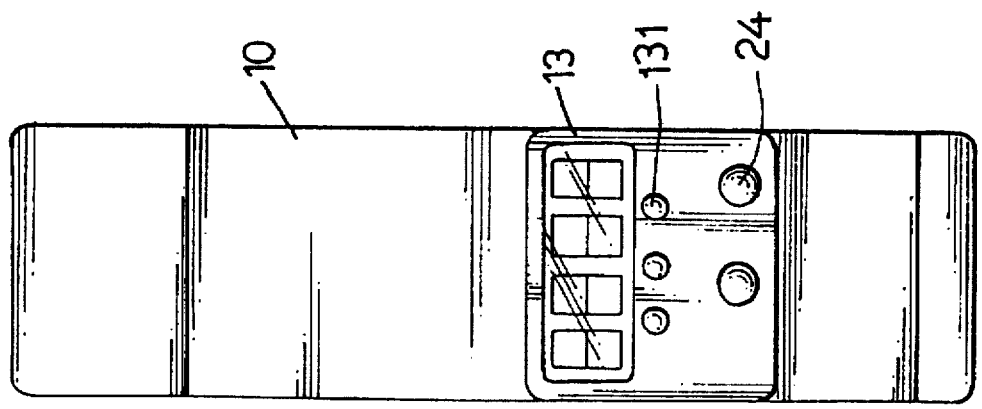
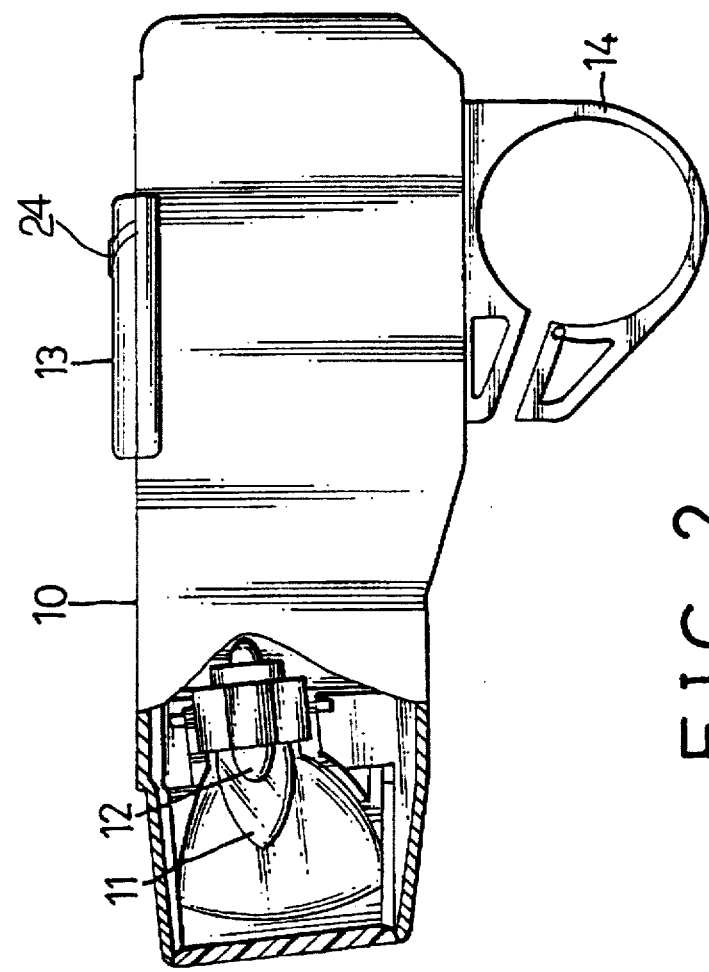

LIGHT DEVICE FOR A BICYCLE

BACKGROUND OF THE INVENTION

1. Field of the Invention

The present invention relates to a light device, and more particularly to a light device for a bicycle.

2. Description of the Prior Art

A typical light device for a bicycle is shown in FIG. 5 and comprises an electric generator 50 secured to the rear fork of the bicycle and having a head 51 for engaging with the wheel 60 so as to be rotated by the wheel 60. A light bulb 52 is secured to the front portion of the bicycle 61 and is electrically coupled to the generator 50 so as to be energized by the generator 50 when the head 51 is rotated by the wheel 60. The light device may not be energized when the bicycle is stopped. However, both the wheel 60 and the head 51 may be damaged after long term of frictional movement therebetween. In addition, the users have to spend more energy for riding the bicycle.

The present invention has arisen to mitigate and/or obviate the afore-described disadvantages of the conventional light devices for a bicycle.

SUMMARY OF THE INVENTION

The primary objective of the present invention is to provide a light device for a bicycle which includes a microprocessor for actuating two light bulbs of different wattages, in which the light bulb of lower wattage may be energized when the bicycle is stopped.

The other objective of the present invention is to provide a device having a displayer for showing the moving speed of the bicycle.

In accordance with one aspect of the invention, there is provided a light device for a bicycle, the bicycle including a fork having a wheel rotatably secured thereto, the light device comprises a sensor for securing to the fork of the bicycle, an inducing block for securing to the wheel of the bicycle and for moving bypass the sensor so as to actuate the sensor, a housing for securing to the bicycle, a microprocessor secured in the housing and coupled to the sensor, a displayer coupled to the microprocessor for displaying a speed of the bicycle, and a light bulb means coupled to the microprocessor so as to be energized when the inducing block moves pass the sensor.

The light bulb means includes two light bulbs of different wattages, and the light device further includes two transistors coupled between the light bulbs and the microprocessor respectively for controlling the light bulbs. A switch is coupled to the microprocessor for controlling the microprocessor.

Further objectives and advantages of the present invention will become apparent from a careful reading of a detailed description provided hereinbelow, with appropriate reference to accompanying drawings.

BRIEF DESCRIPTION OF THE DRAWINGS

FIG. 2 is a partial cross sectional view of the light device;

FIG. 3 is a top plane view of the light device;

DETAILED DESCRIPTION OF THE PREFERRED EMBODIMENT

Figure 1:
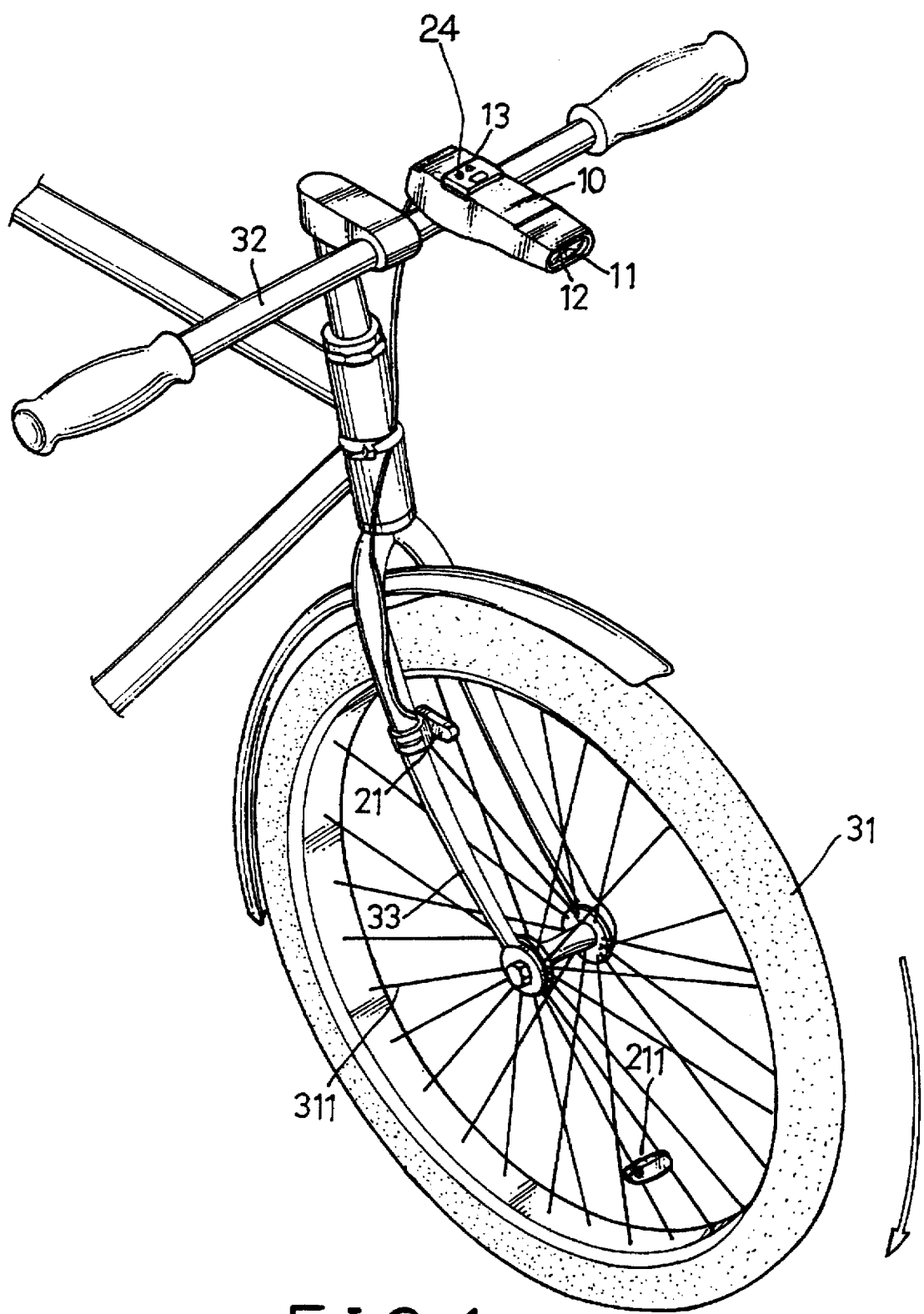
FIG. 1 is a perspective view of a light device for a bicycle in accordance with the present invention.
Figure 5:
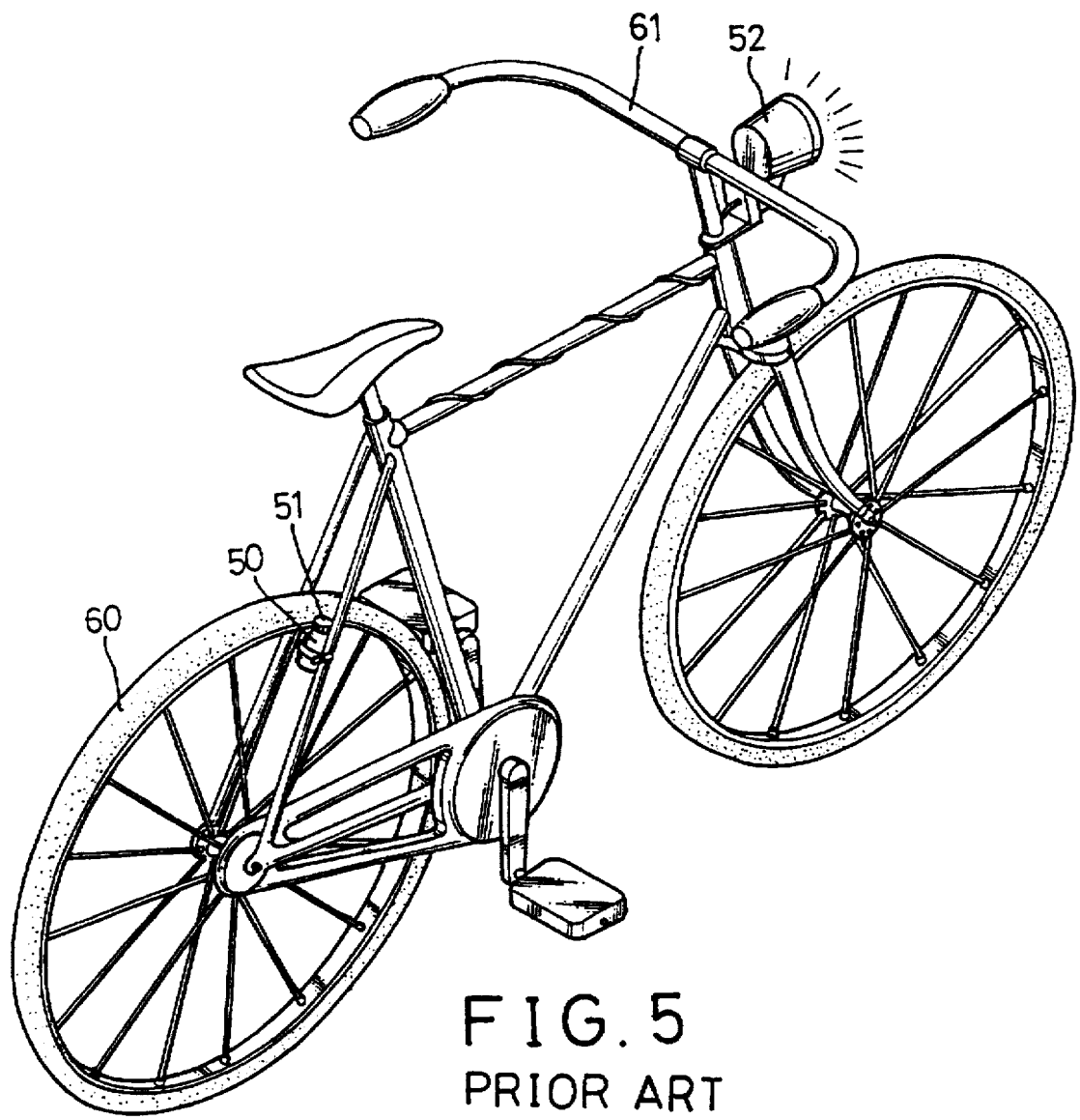
FIG. 5 is a perspective view illustrating the typical light device for the bicycle.

Referring to the drawings, and initially to FIGS. 1 to 3, a light device for a bicycle in accordance with the present invention comprises a sensor 21 secured to the front fork 33 and an inducing block 211 secured to the spokes 311 of the wheel 31 and having an equal radial distance as that of the sensor 21 relative to the wheel hub such that the inducing block 211 may move pass the sensor 21 when the wheel 31 is rotated when the bicycle is ridden by a user. The sensor 21 and the inducing block 211 are made of magnetic materials and are provided for sensing the rotational speed of the wheel 31 and may be calibrated to show the moving speed of the bicycle. In addition, an electric energy may be generated when the inducing block 211 moves pass the sensor 21 in a reciprocating action.

The light device further includes a housing 10 having a clamping device 14 for securing to the handle 32 of the bicycle. The housing 10 includes two light bulbs 11, 12 of different wattages secured in the front portion thereof. The housing 10 includes a displayer 13 for displaying the speed of the bicycle and having a switch button 24 provided thereon.

Figure 4:
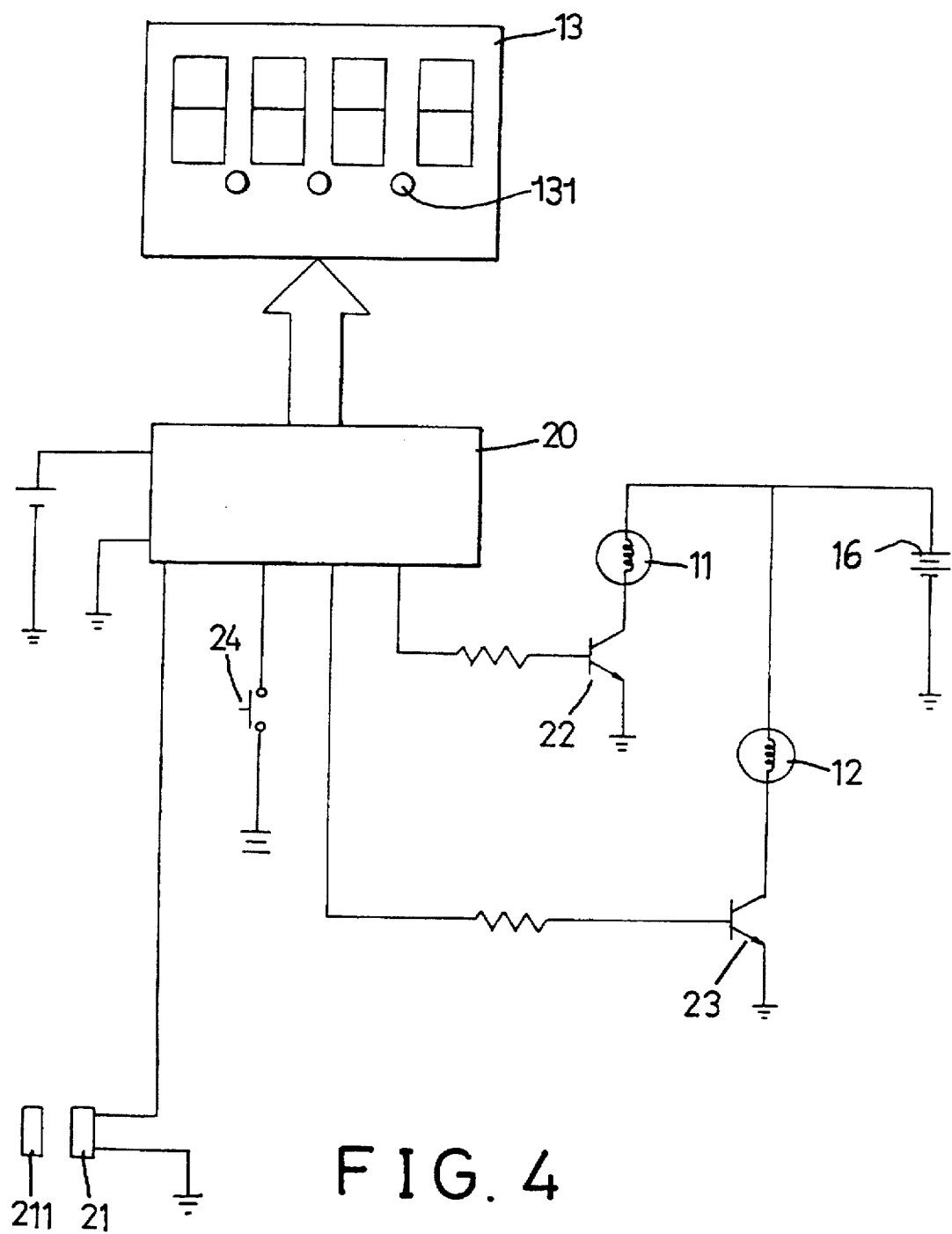
FIG. 4 is an electrical diagram of the light device.

Referring next to FIG. 4, the light device includes a microprocessor 20. The displayer 13 is coupled to the microprocessor 20 for displaying the speed of the bicycle. Two transistors 22, 23 are coupled between the light bulbs 11, 12 and the microprocessor 20. A battery 16 is disposed in the housing 10 and coupled to the electric elements for energizing the light device. When the inducing block 211 moves pass the sensor 21, the sensor 21 is actuated to generate a low potential voltage which is then transmitted to the microprocessor 20 so as to energize and to actuate the light bulbs 11, 12. The switch button 24 is provided to select the lighting modes of the light device.

In operation, for example, when the switch button 24 is depressed once, an automatic mode is selected and the light bulbs 11, 12 may be energized and controlled by the microprocessor 20 according to the relative movement between the sensor 21 and the inducing block 211. In this mode, the light bulb 11 of higher wattage may be energized when the bicycle is ridden in a faster speed and the light bulb 12 of lower wattage may be energized when the bicycle is stopped. It is preferable that the light bulb 11 is turned off when the light bulb 12 of lower wattage is turned on. When the switch button 24 is depressed one more time, the light bulb 11 of higher wattage may be switched on permanently, for example. When the switch button 24 is depressed the third time, both the light bulbs 11, 12 may be switched off at this moment, for example. The displayer 13 may include three lamps 131 for indicating the three modes.

Alternatively, only one light bulb is provided and includes two tungsten filaments of different wattages, such that the single light bulb may provide large light beam when the bicycle is ridden by a user and may provide a small light beam when the bicycle is stopped.

Accordingly, the light device in accordance with the present invention includes a displayer for showing the speed of the bicycle and includes a microprocessor for controlling the large and small light bulbs.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A light device for a bicycle, the bicycle including a fork having a wheel rotatably secured thereto, said light device comprising:

a sensor for securing to the fork of the bicycle, an inducing block for securing to the wheel of the bicycle and for moving past said sensor so as to actuate said sensor, a housing for securing to the bicycle, a microprocessor secured in said housing and coupled to said sensor, a displayer coupled to said microprocessor for displaying a speed of the bicycle, and a light bulb means coupled to said microprocessor so as to be energized when said inducing block moves past said sensor, said light bulb means including two light bulbs of different wattages, and said light device further including two transistors coupled between said light bulbs and said microprocessor respectively for controlling said light bulbs.

2. A light device according to claim 1 further comprising a switch coupled to said microprocessor for controlling said microprocessor.

* * * * *